United States Patent [19]
Hoover et al.

[11] Patent Number: 6,103,792
[45] Date of Patent: Aug. 15, 2000

[54] NON-PHENOLIC RUBBER TACKIFIER

[75] Inventors: James W. Hoover, Akron, Ohio; James V. Fusco, Red Bank, N.J.; Pamela S. MacMillan, Lakewood, Ohio

[73] Assignee: Flow Polymers, Inc., Cleveland, Ohio

[21] Appl. No.: 09/054,661

[22] Filed: Apr. 3, 1998

Related U.S. Application Data

[60] Provisional application No. 60/042,716, Apr. 8, 1997.
[51] Int. Cl.⁷ .............................. C08L 3/00; C08L 3/14; C10C 3/00
[52] U.S. Cl. .............................. 524/47; 524/52; 524/53; 524/64; 106/216.1
[58] Field of Search .............................. 524/47, 52, 53, 524/64; 106/216.1

[56] References Cited

U.S. PATENT DOCUMENTS

| | | |
|---|---|---|
| 4,018,730 | 4/1977 | McDonald . |
| 4,548,966 | 10/1985 | Moore ........................................ 524/53 |
| 4,766,024 | 8/1988 | Nath et al. .............................. 428/139 |
| 4,769,096 | 9/1988 | Vander Giessen et al. .............. 156/69 |
| 4,812,327 | 3/1989 | Hanazawa et al. ................. 427/388.4 |
| 4,956,500 | 9/1990 | Vermilion ............................... 525/54.5 |
| 5,001,179 | 3/1991 | Kauffman et al. ...................... 524/275 |
| 5,025,044 | 6/1991 | Christell et al. ........................ 523/334 |
| 5,650,454 | 7/1997 | Hoover et al. ............................ 524/47 |
| 5,672,639 | 9/1997 | Corvasce et al. ......................... 524/52 |

*Primary Examiner*—Nathan M. Nutter
*Attorney, Agent, or Firm*—Pearne, Gordon, McCoy & Granger LLP

[57] ABSTRACT

A non-phenolic tackifier compound which includes starch and asphalt, and is substantially free of cross-linked fatty acids. Preferably, the tackifier compound further includes a hydrocarbon tackifying resin, and a binding resin composed of a styrene copolymer, or an ethylene copolymer.

32 Claims, No Drawings

NON-PHENOLIC RUBBER TACKIFIER

CROSS-REFERENCE TO RELATED APPLICATION

This application claims the benefit of U.S. Provisional Application No. 60/042,716, filed Apr. 8, 1997.

BACKGROUND OF THE INVENTION

This invention relates to tackifiers for rubber and in particular to non-phenolic tackifiers for rubber used in tire building.

A rubber product, such as a tire, is often manufactured from several pieces of vulcanizable rubber compound, commonly referred to as green rubber. The green rubber is typically formed from a polymer, filler, plasticizer, tackifier, process aids, and a vulcanizing agent. The pieces of green rubber are typically pressed together and then inserted into a mold. In the mold, the pieces of green rubber are subjected to heat and pressure to effect curing and formation of the tire. The tackifier is included in the green rubber in order to increase the adherence of the pieces of green rubber to each other, i.e., to increase their tack. If there is insufficient tack between laminated layers of green rubber, air may become trapped between the layers, which is undesirable.

Generally, there are two different types of tackifiers in the rubber industry: hydrocarbon resin tackifiers and phenolic resin tackifiers. Sometimes, blends of hydrocarbon resin tackifiers and phenolic resin tackifiers are used. Hydrocarbon tackifiers provide good initial tack, but typically do not provide good long-term tack. Phenolic tackifiers provide good initial and long-term tack, but are typically expensive. In addition, when pellets of phenolic tackifiers are subjected to heat and humidity for a period of time, the pellets typically join together to form an unwieldy mass. Phenolic tackifiers also contribute to mold fouling, which is a buildup of black sticky residue on the mold. In some cases, phenolic tackifiers will also interfere with the cure of green rubber components.

Based upon the foregoing, there is a need in the art for a tackifier for a rubber compound, wherein the tackifier provides good initial and long-term tack, does not readily mass together, and reduces undesirable side-effects, such as mold fouling. The present invention is directed to such a tackifier and a rubber compound containing the same.

SUMMARY OF THE INVENTION

It therefore would be desirable, and is an advantage of the present invention, to provide a non-phenolic tackifier compound or composition and a vulcanizable rubber compound containing the same, wherein the tackifier compound provides the vulcanizable rubber compound with good initial and long-term tack, and has good anti-massing and anti-mold fouling characteristics. In accordance with the present invention, the tackifier compound or composition comprises starch and asphalt, and is substantially free of cross-linked fatty acids.

DETAILED DESCRIPTION OF THE PREFERRED EMBODIMENTS

It should be noted that parts are parts by weight and percents are weight percents unless otherwise indicated or apparent. In addition, when a preferred range such as 5–25 is given, this means preferably at least 5 and preferably not more than 25.

The tackifier compound of the present invention is non-phenolic, and free or substantially free of fatty acids and cross-linked fatty acids. As used herein, "non-phenolic" shall mean free from the presence of phenolic components, such as phenols, phenol formaldehyde, alkyl phenol formaldehyde, octylphenol formaldehyde, alkyl phenols, aldehydes, such as formaldehyde and furfural, and terpene phenolics. The tackifier compound is for addition to a vulcanizable rubber compound and has the following preferred formulation (Formulation 1).

| | | Weight Percent | | |
|---|---|---|---|---|
| | Component | Preferred | Less Preferred | Less Preferred |
| 1. | Starch | 10.0 | 5–15 | 3–20 |
| 2. | Asphalt | 60.0 | 50–70 or 40–76 | 25–85 or 30–82 |
| 3. | Binding Resin | 5.0 | 1–10 | 1–15 |
| 4. | High Softening Point Natural Hydrocarbon Resin | 20.0 | 10–30 | 5–40 |
| 5. | Tackifying Resin | 5.0 | 1–10 | 1–15 |

As is well known, starch is a high molecular weight carbohydrate of the general formula $(C_6H_{10}O_5)_n$ comprised of linear (amylose) and branched (amylopectin) polymers of (alpha)-D-glucopyranosyl units. Starch is typically obtained from naturally occurring plants, such as corn, wheat, barley, rice, and potatoes. It is known to use starch as a filler for rubber products as is disclosed in U.S. Pat. No. 5,672,639 to Corvasce et al. which is incorporated herein by reference. It is also known to use starch combined with the polymer chains of cross-linked fatty acids so as to increase the tear resistance of rubber products as is disclosed in U.S. Pat. No. 5,650,454 to Hoover et al, which is assigned to the assignee of the present invention, and is incorporated herein by reference.

Surprisingly, it has been found that when starch is added to vulcanizable rubber in the absence of cross-linked fatty acids, the starch greatly increases the initial and aged tack properties of the vulcanizable rubber. Thus, the starch of the present invention greatly increases the tack of the vulcanizable rubber compound.

Preferably, the starch is corn starch, potato starch, or dextrin, which is derived from vegetable matter. More preferably, the starch is unmodified corn starch, such as is sold by Grain Processing Corp. of Muscatine, Iowa 52761 under the product name B20F. The corn starch preferably has a bulk density of about 28 lbs/ft$^3$ loose and about 35 lbs/ft$^3$ packed. Preferably, the corn starch is a fine powder with about 85% passing through a 200 mesh screen (U.S. Standard Sieve No. 200) and about 45% passing through a 325 mesh screen (U.S. Standard Sieve No. 325), and has a moisture content, by weight, of about 11–12% and a pH of 6.

As is known, asphalt is typically miscible in rubber. The asphalt component of the present invention helps carry the tackifier compound into the vulcanizable rubber compound and disperses it therein. It is also believed that the asphalt component helps increase or enhance the tack of the vulcanizable rubber compound.

Preferably, the asphalt component is a blend of 50%, less preferably 40–60%, less preferably 30–70%, less preferably 20–80%, less preferably 10–90% asphalt, and 50%, less preferably 40–60%, less preferably 30–70%, less preferably 20–80%, less preferably 10–90% blown asphalt. Less preferably, the asphalt compound is 100% asphalt, or 100% blown asphalt. The asphalt is preferably monor asphalt having a softening point of 170–180° F. and a needle penetration of 0.5–1.0, available from Sun Company, Inc. of Philadelphia, Pa. The blown asphalt is preferably air-blown, cross-linked asphalt or oxidized asphalt (blown), having a softening point of 239°–257° F. and a needle penetration (at 115° F.) of 15–20, available as Product Flow-92 from Koch Materials Company of Heath, Ohio.

The binding resin component of the present invention binds the tackifier compound together, thereby making the tackifier compound pelletizable or flakeable. Preferably, the binding resin is a styrene copolymer, or an ethylene copolymer. More preferably, the binding resin is an ethylene-vinyl acetate (EVA) copolymer, or a styrene-butadiene-styrene (S-B-S) copolymer, such as Kraton D1101 thermoplastic rubber available from Shell Oil Co. of Houston, Tex. Still more preferably, the binding resin is an EVA copolymer having a Shore A hardness of 76–88 and a melt index of 2–30, preferably 20–30, available as Product AT-2820 or AT-1941 from AT Plastics Inc. of Brampton, Ontario.

The high softening point (HSP) natural hydrocarbon resin component of the present invention decreases the mold fouling of the vulcanizable rubber compound. The HSP natural hydrocarbon resin component also increases the tack-enhancing and anti-massing properties of the tackifier compound. The HSP natural hydrocarbon resin component preferably has a softening point of about 280°–420° F, more preferably about 290°–360° F., and preferably is gilsonite, also known as uintaite, a natural thermoplastic hydrocarbon resin or high softening point asphalt, having a softening point of 300°–400° F., more preferably, 300°–360° F., more preferably 300°–330° F. and a needle penetration of 0, available from Ziegler Chemical and Mineral Corp. of Jericho, N.Y. Less preferably, the HSP natural hydrocarbon resin component is anthracite filler from Asbury Graphite Mills.

The tackifying resin component of the present invention further increases the tack of the vulcanizable rubber compound. Preferably, the tackifying resin component is a hydrocarbon tackifying resin, preferably petroleum-based and aliphatic, sold by the Exxon Chemical Co. under the product name Escorez, preferably the 1000 Series. Less preferably, the tackifying resin component is an aliphatic hydrocarbon tackifying resin sold by Neville Chemical Co. under the product name Nevtac 100, or other tackifiers or hydrocarbon tackifying resins known in the art.

The tackifier compound of the present invention is preferably formed by blending the components together, but not reacting the components together. The components do not react with each other. More specifically, the tackifier compound is preferably formed as follows. A mixing reactor vessel with a suitable capacity is selected. The reactor vessel is heated to a temperature of about 400° to 420° F. The asphalt component, the binding resin component, and the HSP natural hydrocarbon resin component are then added to the reactor vessel and allowed to blend for about 2 hours. The tackifying resin component is then added and blended for about 10–15 minutes. The starch is slowly added to the reactor vessel and blended with the other components. The components are blended and heated until the starch is uniformly dispersed, which generally takes about 10 minutes. After the starch is dispersed, the mixture of components is preferably pelletized under water to complete the formation of the tackifier compound. Alternately, the mixture of components can be placed on a cooling belt and flaked, or the mixture of components can be pastillated, i.e., extruded in small droplets onto a cooling conveyor belt. The blending and subsequent pelletizing, flaking, or pastillating of the components can be done in a continuous system such as a mixing extruder, or other continuous system known in the art.

When completely formed, the tackifier compound of Formulation 1 is hard, black, and solid, and is shaped as a pellet or a flake. The tackifier compound has a softening point around 257° F., less preferably 245°–270° F., an ash content of about 1.6%, less preferably 1–3%, and a specific gravity of about 1.08, less preferably 1.04–1.12. The tackifier compound is used by adding it to the vulcanizable rubber compound the way other known tackifiers are added to vulcanizable rubber. Preferably, the tackifier compound is added to the vulcanizable rubber compound in an amount so there are about 1–20, more preferably 1–10, more preferably 2–7, more preferably about 4 parts tackifier compound per hundred parts rubber.

The tackifier compound of the present invention can be used in many different types of vulcanizable rubber. The tackifier compound finds particular utility in vulcanizable rubber used for building tires, such as tire treads, carcasses, innerliners, sidewalls, and sidewall components. The tackifier compound is also useful in vulcanizable rubber for coating stocks, hoses, belting, inner tubes, general purpose rubbers, and other synthetic and natural elastomers.

Preferably, the vulcanizable rubber compound to which the tackifier compound is added comprises rubber selected from the group consisting of natural rubbers, synthetic rubbers, and mixtures thereof. The synthetic rubbers are preferably styrene-butadiene rubber, isobutylene-based rubbers such as butyl rubber, halobutyl rubber, and isobutylene-paramethylstyrene copolymer rubber, polychloroprene rubber, polybutadiene rubber, polyisoprene rubber, EPDM rubber, and nitrile rubber. Less preferably, the synthetic rubbers are acrylic, chlorinated polyethylene, epichlorohydrin, ethylene/acrylic, EPM, isoprene-acrylonitrile, polyisobutylene, polynorbornene, and styrene-isoprene.

The vulcanizable rubber compound may include accelerators, retarders, activators, vulcanizers, antioxidants, antiozonants, plasticizers, processing aids, stabilizers, tackifiers, extenders, fillers, reinforcing materials, blowing agents, lubricants, polymerization materials, and other rubber compounding materials known in the art.

The tackifier compound of the present invention provides many advantages. The tackifier compound does not have a phenolic component, which is environmentally desirable. When added to the vulcanizable rubber compound, the tackifier compound reduces stain migration, provides good initial and long-term tack, and reduces undesirable side-effects, such as mold fouling.

In addition to improving the processing characteristics of the vulcanizable rubber compound, the tackifier compound does not readily mass together, which provides the tackifier compound with highly favorable handling characteristics and makes the tackifier compound ideal for use in processes utilizing automatic weighing systems.

The following Examples further illustrate various aspects of the invention. Unless otherwise indicated, the ingredients are combined using methods known in the art or as described above.

EXAMPLE 1

A tackifier compound was prepared in accordance with the preferred embodiment of the present invention by mixing 10 parts corn starch, 60 parts asphalt (30 parts monor asphalt, 30 parts blown asphalt), 5 parts EVA copolymer, 20 parts gilsonite, and 5 parts Escorez 1102. The tackifier compound with the foregoing formulation (hereinafter referred to as the "Inventive Compound") was used in Examples 1 and 2.

A test was conducted wherein the massing characteristics of the Inventive Compound were compared with the massing characteristics of a phenolic tackifier (hereinafter referred to as "Phenolic S") sold by the Schenectady Chemical Co under the product name SP1068. In the test, a mass of pellets of the Inventive Compound and a mass of pellets of Phenolic S were placed in an oven at 122° F. and subjected to a force of 0.25 lbf/in² for a period of 5 days. The two masses of pellets were checked daily. After 1 day, the pellets of Phenolic S were fused together to form a solid mass. Surprisingly, the pellets of the Inventive Compound were still free flowing after 5 days. Thus, the Inventive Compound demonstrated surprisingly improved anti-massing properties as compared to the Phenolic S tackifier.

EXAMPLE 2

A Control Batch of tire carcass and an Inventive Batch of tire carcass were prepared pursuant to identical formulations, except for the use of different tackifiers. The Control Batch used an amount of the Phenolic S as the tackifier, while the Inventive Batch utilized an identical amount of the Inventive Compound as the tackifier. The Control Batch and the Inventive Batch were prepared pursuant to the following formulation:

| Ingredient | Amount (parts) |
| --- | --- |
| TSR20 Natural Rubber | 60.00 |
| SBR 1778 Synthetic Rubber | 55.00 |
| N660 Carbon Black | 50.00 |
| Zinc Oxide | 3.00 |
| Stanlube-60 | 6.00 |
| Stearic Acid | 1.00 |
| Tackifier | 4.00 |
| Sulfur | 2.45 |
| BBTS accelerator | .60 |
| Total Weight | 182.05 |

Both the Control Batch and the Inventive Batch were prepared in a laboratory Brabender at 212° F. with 55 rpm rotor speed using the following sequential procedure. The TSR20 natural rubber, the SBR synthetic rubber, and the zinc oxide were premasticated for about 1 minute. About 75% of the N660 carbon black and the tackifier (Inventive Compound or Phenolic S) were added and mixed for about 1.5 minutes. The Stanlube-60, the stearic acid, and the remaining 25% of the N660 carbon black were added and mixed for about 1.5 minutes. The components were then discharged and cooled. The sulfur and the BBTS accelerator were added on a laboratory mill.

A Side Wall compound was also prepared with the Inventive Compound pursuant to the following formulation.

| Ingredient | Amount (parts) |
| --- | --- |
| TSR20 Natural Rubber | 50.00 |
| Budene 1207 Synthetic Rubber | 50.00 |
| N330 Carbon Black | 50.00 |
| Zinc Oxide | 5.00 |
| Sundex 790 Aromatic Oil | 8.00 |
| Stearic Acid | 2.00 |
| Flectol Antioxidant | 2.00 |
| Inventive Compound | 4.00 |
| Sunolite 240 Petroleum Wax | 2.00 |
| Sulfur | 1.25 |
| Santocure MOR | 1.75 |
| Total Weight | 176.00 |

The Side Wall compound was also prepared in a laboratory Brabender at 212° F. with 55 rpm rotor speed using the following sequential procedure. The TSR20 natural rubber, the Budene 1207 synthetic rubber, and the zinc oxide were premasticated for about 1 minute. About 75% of the N330 carbon black and the Inventive Compound were added and mixed for about 1.5 minutes. The Sundex 790 aromatic oil, the Sunolite 240 petroleum wax, the stearic acid, the Flectol antioxidant, and the remaining 25% of the N330 carbon black were added and mixed for about 1.5 minutes. The components were then discharged and cooled. The sulfur and the Santocure MOR accelerator were added on a laboratory mill.

The physical properties of the Control Batch and the Inventive Batch were tested in accordance with ASTM methods, with the following results. The heat aged physicals are at 72 hours at about 158° F.

|  | Control Batch | Inventive Batch |
| --- | --- | --- |
| Original Cured Physicals |  |  |
| Durometer (points) | 50 | 51 |
| 100% Modulus (psi) | 190 | 212 |
| 300% Modulus (psi) | 938 | 941 |
| Elongation (% at break) | 550 | 563 |
| Tensile (psi) | 2334 | 2382 |
| Tear C (psi) | 145 | 155 |
| Heat Aged Physicals |  |  |
| Durometer (points) | 52 | 52 |
| 100% Modulus (psi) | 273 | 258 |
| 300% Modulus (psi) | 1311 | 1193 |
| Elongation (% at break) | 488 | 500 |
| Tensile (psi) | 2461 | 2328 |
| Tear C (psi) | 157 | 159 |

The tack between two pieces of Control Batch and the tack between two pieces of the Inventive Batch were then tested, with the following results. All measurements are in psi. The symbol "RT" stands for room temperature and the symbol "RH" stands for relative humidity.

|  | Control to Control | Inventive to Inventive |
| --- | --- | --- |
| Initial (RT, 65% RH) | 24 | 34 |
| Exposed 2 Days (RT, 65% RH) | 26 | 27 |
| Exposed 5 Days (RT, 65% RH) | 22 | 24 |
| Exposed 3 Days (86° F., 80% RH) | 25 | 28 |

The tack between a piece of the Control Batch and a piece of the Side Wall compound, and the tack between a piece of the Inventive Batch and a piece of the Side Wall compound were tested, with the following results.

|  | Control to Side Wall | Inventive to Side Wall |
| --- | --- | --- |
| Initial (RT, 65% RH) | 8 | 11 |
| Exposed 2 Days (RT, 65% RH) | 9 | 17 |
| Exposed 5 Days (RT, 65% RH) | 8 | 13 |
| Exposed 3 Days (86° F, 80% RH) | 12 | 19 |

The cure characteristics of the Control Batch and the Inventive Batch were measured using a rheometer at a temperature of 320° F. for 30 minutes. The motor of the rheometer had a 100 inch-lb torque range and a 3° arc.

|  | Max. Torque (lbs) | Min. Torque (lbs) | Scorch Time (min) | Tc(90) (min) |
| --- | --- | --- | --- | --- |
| Control Batch | 45.91 | 3.07 | 3.92 | 17.33 |
| Inventive Batch | 49.77 | 3.26 | 5.17 | 17.50 |

As indicated by the above results, the tackifier compound of the present invention demonstrates equal, or better, rubber to rubber tack properties at all environmental conditions and with all substrates, i.e., carcass to carcass, and carcass to sidewall, when compared to the Phenolic S tackifier. Thus, the tackifier of the present invention can be used in place of phenolic tackifiers in those formulations where phenolic tackifiers are presently used. These results are surprising and unexpected.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A composition for use as a tackifier in a vulcanizable rubber compound, said composition comprising at least 3 weight percent starch and at least 25 weight percent asphalt, and being substantially free of cross-linked fatty acids.

2. The composition of claim 1, wherein the composition is non-phenolic.

3. The composition of claim 2, wherein the starch is corn starch and the asphalt comprises monor asphalt and blown asphalt.

4. The composition of claim 2, wherein the composition has about 2–8 parts by weight asphalt per 1 part by weight starch.

5. The composition of claim 1, further comprising an amount of binding resin effective to make the composition pelletizable.

6. The composition of claim 5, wherein the binding resin is selected from the group consisting of an EVA copolymer and an SBS copolymer.

7. The composition of claim 1, further comprising 1–15 weight percent hydrocarbon tackifying resin.

8. The composition of claim 7, further comprising 1–15 weight percent EVA copolymer.

9. The composition of claim 7, wherein the composition has more parts by weight of the starch than parts by weight of the hydrocarbon tackifying resin.

10. The composition of claim 7, wherein the hydrocarbon tackifying resin is an aliphatic hydrocarbon tackifying resin.

11. The composition of claim 9, wherein the composition has about 2 parts by weight of the starch per 1 part by weight of the hydrocarbon tackifying resin, and wherein the asphalt is at least 50 weight percent of the composition.

12. A non-phenolic rubber tackifier consisting essentially of asphalt, EVA copolymer, gilsonite, corn starch, and an aliphatic hydrocarbon tackifying resin.

13. The tackifier of claim 12, wherein the tackifier has about 2 parts by weight of the corn starch per 1 part by weight of the aliphatic hydrocarbon tackifying resin, and wherein the asphalt is at least 50 weight percent of the tackifier.

14. The tackifier of claim 12, wherein the tackifier has about 1 part by weight of monor asphalt per 1 part by weight of blown asphalt.

15. A vulcanizable rubber compound comprising:
   rubber selected from the group consisting of natural rubbers, synthetic rubbers, and mixtures of any of the foregoing; and
   a non-phenolic tackifier compound comprising at least 3 weight percent starch and at least 25 weight percent asphalt, and being substantially free of cross-linked fatty acids.

16. The vulcanizable rubber compound of claim 15, wherein the synthetic rubbers are selected from the group consisting of styrene-butadiene rubber, butyl rubber, halobutyl rubber, isobutylene-paramethylstyrene copolymer rubber, polychloroprene rubber, polybutadiene rubber, EPDM rubber, and nitrile rubber.

17. The vulcanizable rubber compound of claim 15, wherein the rubber compound has about 1–20 parts of the tackifier compound per 100 parts of the rubber.

18. The vulcanizable rubber compound of claim 15, wherein the tackifier compound has about 2–8 parts by weight of the asphalt per 1 part by weight of the starch.

19. The vulcanizable rubber compound of claim 15, further comprising filler consisting essentially of carbon black.

20. The vulcanizable rubber compound of claim 15, wherein the starch is corn starch and the asphalt is comprised of monor asphalt and blown asphalt, and wherein the tackifier compound further comprises EVA copolymer, gilsonite, and an aliphatic hydrocarbon tackifying resin.

21. The composition of claim 2, wherein the starch and the asphalt are blended together, but not reacted together.

22. The composition of claim 2, wherein the composition comprises not more than 20 weight percent starch and not more than 85 weight percent asphalt.

23. The composition of claim 2, wherein the composition comprises at least 50 weight percent asphalt.

24. The composition of claim 23, wherein the starch and the asphalt are blended together, but not reacted together.

25. The composition of claim 24, further comprising 1–15 weight percent binding resin.

26. The composition of claim 25, further comprising 1–15 weight percent tackifying resin.

27. The composition of claim 26, wherein the composition has a softening point of 245°–270° F.

28. The composition of claim 27, wherein the composition has a specific gravity of 1.04–1.12.

29. The composition of claim 1, further comprising 1–15 weight percent binding resin.

30. The tackifier of claim 12, wherein the EVA copolymer is 1–15 weight percent of the rubber tackifier, the gilsonite is 5–40 weight percent of the rubber tackifier, the corn starch is 3–20 weight percent of the rubber tackifier, and the aliphatic hydrocarbon tackifying resin is 1–15 weight percent of the rubber tackifier.

31. The vulcanizable rubber compound of claim 17, wherein the tackifier compound comprises at least 50 weight percent asphalt and wherein the tackifier compound further comprises 1–15 weight percent binding resin and 1–15 weight percent tackifying resin.

32. The vulcanizable rubber compound of claim 31, wherein the tackifier compound has a softening point of 245°–270° F.

* * * * *